UNITED STATES PATENT OFFICE.

PETER HARDER, OF DANVILLE, PENNSYLVANIA.

IMPROVED COMPOSITION FOR PAVEMENTS, &c.

Specification forming part of Letters Patent No. 38,582, dated May 19, 1863.

*To all whom it may concern:*

Be it known that I, PETER HARDER, of Danville, Montour county, in the State of Pennsylvania, have invented a new and useful Composition of Matter for Pavements, Garden-Walks, Vault or Cellar Floors, &c.; and I do hereby declare that the following is a full and exact description thereof.

To enable those skilled in the art to make and use my improved composition, I will fully describe it.

I first prepare the ground or floor upon which the composition is to be placed by rolling it with a heavy roller and laying down a course of pebbles or iron cinders well rolled. I then prepare my composition as follows: I take forty gallons of coal-tar, (thoroughly boiled, so as to expel all watery particles, and thereby rendered more capable of drying from exposure.) To this I add twenty pounds of mineral paint or pulverized-iron ore and half a bushel of dry slaked lime. To this mass I add about equal proportions of iron cinders, coke, and coal-ashes, so as to give the whole mass a working consistency. This composition is then spread over the ground, and is then sprinkled over with fine iron-cinders and coarse sand, which I continue to add, rolling it in with a heavy roller, until no more can be absorbed by the composition and the surface becomes dry and solid.

What I claim as new, and desire to secure by Letters Patent, is—

The composition for pavements substantially herein set forth.

In testimony that I claim the above I hereunto set my hand in presence of witnesses.

PETER HARDER.

Witnesses:
J. D. HAHN,
THOMAS BRANDEN.